US012774969B2

(12) United States Patent
Glass et al.

(10) Patent No.: US 12,774,969 B2
(45) Date of Patent: Oct. 27, 2026

(54) MAGNETIC DEFLECTOR AND METHODS OF USE THEREOF

(71) Applicant: UNIVERSITY OF NORTH TEXAS, Denton, TX (US)

(72) Inventors: Gary Alan Glass, Denton, TX (US); Todd Byers, Denton, TX (US); Bibhudutta Rout, Denton, TX (US)

(73) Assignee: UNIVERSITY OF NORTH TEXAS, Denton, TX (US)

( * ) Notice: Subject to any disclaimer, the term of this patent is extended or adjusted under 35 U.S.C. 154(b) by 208 days.

(21) Appl. No.: 18/742,303

(22) Filed: Jun. 13, 2024

(65) Prior Publication Data

US 2024/0418662 A1 Dec. 19, 2024

Related U.S. Application Data

(60) Provisional application No. 63/507,884, filed on Jun. 13, 2023.

(51) Int. Cl.
*G01N 23/22* (2018.01)
*G01N 23/2257* (2018.01)

(52) U.S. Cl.
CPC ..... *G01N 23/2257* (2013.01); *G01N 2223/30* (2013.01)

(58) Field of Classification Search
CPC ....................... G01N 23/2257; G01N 2223/30
See application file for complete search history.

(56) References Cited

U.S. PATENT DOCUMENTS 6,160,262 A * 12/2000 Aoki ....................... H01J 49/26 250/398
2009/0314960 A1* 12/2009 Balakin ................ A61N 5/1049 250/492.3

* cited by examiner

*Primary Examiner* — Nicole M Ippolito
(74) *Attorney, Agent, or Firm* — Thomas | Horstemeyer, LLP

(57) ABSTRACT

Various examples are provided related to magnetic deflectors and their use in, e.g., proton-induced X-ray emission (PIXE) spectroscopy. In one example, a magnetic deflector includes first and second magnets separated by a gap; a ferromagnetic yoke surrounding the magnets, the yoke extending between a ferromagnetic front cover and rear cover, each including a canal extending through the cover; and a removable entrance aperture detachably attached to the front cover. The entrance aperture includes an opening aligned with the canal of the front cover to limit ions entering the magnetic deflector through the entrance aperture to a specified conical region. A direction of trajectory of an ion entering the magnetic deflector is altered by the magnetic field as it travels through the gap. The magnetic deflector can be used in a PIXE spectroscopy system to enable detection of low energy x-rays emitted from low-Z elements.

20 Claims, 10 Drawing Sheets

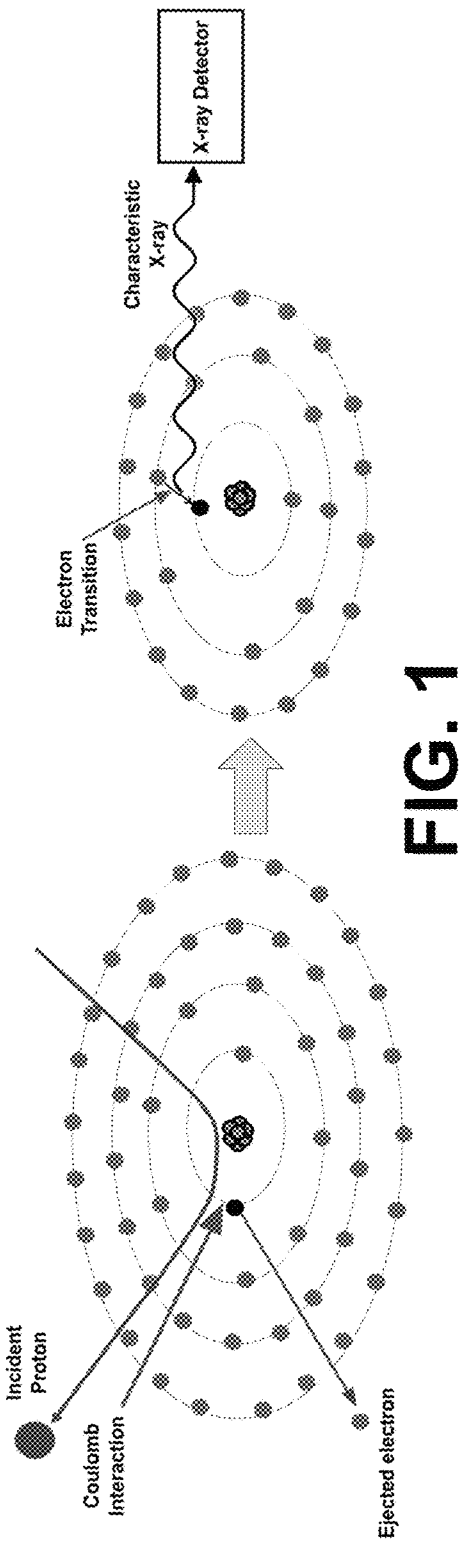
FIG. 1
Typical PIXE setup
FIG. 2A
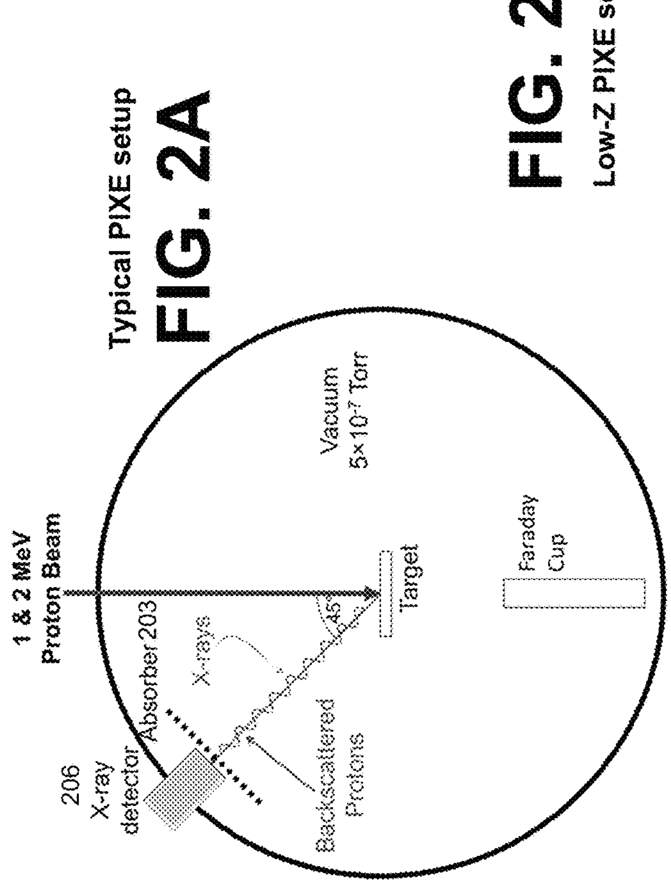
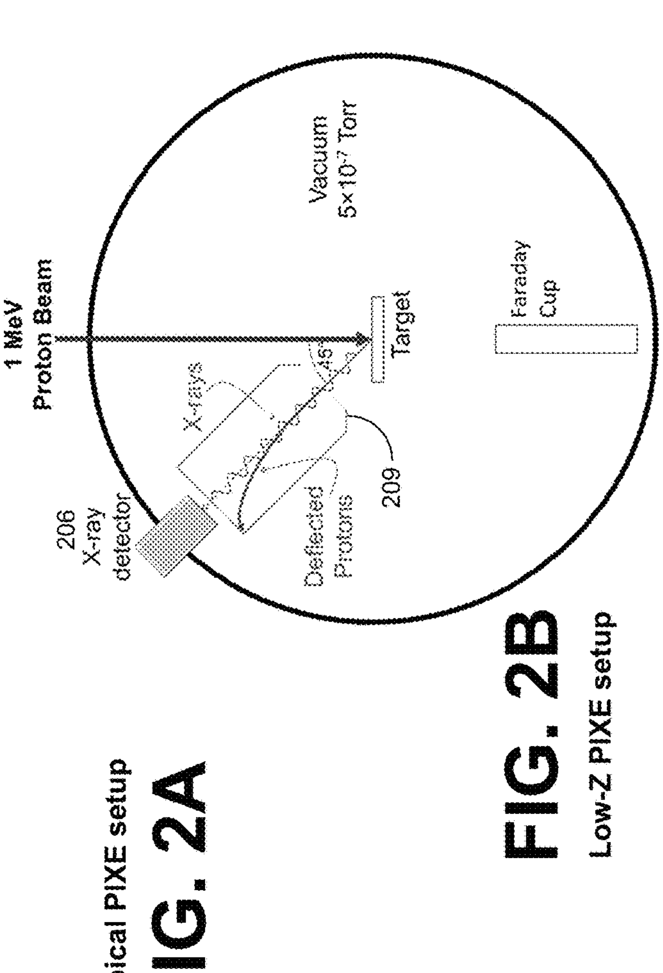
FIG. 2B
Low-Z PIXE setup

MAGNETIC DEFLECTOR AND METHODS OF USE THEREOF

CROSS REFERENCE TO RELATED APPLICATIONS

This application claims priority to, and the benefit of, U.S. provisional application entitled "Magnetic Deflector and Methods of Use Thereof" having Ser. No. 63/507,884, filed Jun. 13, 2023, which is hereby incorporated by reference in its entirety.

BACKGROUND

Improvements made to ultra-thin windows for X-ray detectors in recent years have allowed the detection of elements as light as lithium. However, the use of these detectors for proton-induced X-ray emission (PIXE) spectroscopy has been limited to the quantification of elements heavier than aluminum due to the necessity of an absorber thick enough to prevent high energy backscattered protons from damaging the detector. These absorbers limit the detection of low energy X-rays (<1 keV) produced by light element constituents in the sample, thus preventing the trace quantification of those elements.

SUMMARY

Aspects of the present disclosure are related to magnetic deflectors and their use in, e.g., proton-induced X-ray emission (PIXE) spectroscopy. In one aspect, among others, a magnetic deflector comprises first and second magnets extending substantially parallel to each other, the first and second magnets separated by a gap having a fixed distance, the first and second magnets establishing a magnetic field across the gap; a ferromagnetic yoke surrounding the first and second magnets, the yoke extending between a ferromagnetic front cover and a ferromagnetic rear cover, each of the front cover and the rear cover comprising a canal extending through the front and rear cover from an inner surface adjacent to the gap to an outer surface opposite the gap, the canals of the front and rear covers axially aligned with each other and the gap when the first and second magnets are enclosed within the yoke and front and rear covers; and a removable entrance aperture detachably attached to the front cover, the entrance aperture comprising an opening aligned with the canal of the front cover, the opening configured to limit ions entering the magnetic deflector through the entrance aperture to a specified conical region within the gap, where a direction of trajectory of an ion entering the magnetic deflector is altered by the magnetic field as it travels through the gap.

In one or more aspects, the magnetic deflector can further comprise a plurality of alignment spacers configured to align the first and second magnets within the yoke, wherein the plurality of alignment spacers are nonmagnetic. The plurality of alignment spacers can be positioned between the first and second magnets and sidewalls of the yoke to secure the first and second magnets in position without epoxy or adhesive. At least a portion of the plurality of alignment spacers can be configured to maintain the fixed distance of the gap between the first and second magnets. Individual alignment spacers of the at least a portion of the plurality of alignment spacers can comprise a shoulder that maintains the fixed distance of the gap between the first and second magnets. In some aspects, the magnetic deflector can further comprise an isolating spacer adjacent to the outer surface of the rear cover, the isolating spacer configured to electrically isolate the magnetic deflector from a detector positioned adjacent to the rear cover. The isolating spacer can be a Teflon spacer.

In various aspects, the yoke can comprise first and second portions having a U-shaped cross-section, wherein sidewalls of the first and second portions align to surround the first and second magnets. The front cover can comprise a recess in the outer surface configured to receive the removable entrance aperture, the recess aligned with the canal extending through the front cover. The magnetic deflector can comprise a removable exit aperture detachably attached to the rear cover, the exit aperture comprising an opening aligned with the canal of the rear cover, the opening configured to limit ions exiting the magnetic deflector through the exit aperture. The opening of the exit aperture can be substantially aligned with the opening of the entrance aperture. The magnetic deflector can comprise a mounting plate detachably attached to the rear cover. The magnetic field can be substantially uniform along a length of the first and second magnets. The magnetic field can be about 0.8 T or greater.

In another aspect, a proton-induced X-ray emission (PIXE) spectroscopy system comprises a proton source configured to direct a charged ion beam at a target in a vacuum chamber; an X-ray detector configured to detect X-ray emissions from the target; and a magnetic deflector positioned between the target and the X-ray detector; the magnetic deflector comprising: first and second magnets extending substantially parallel to each other, the first and second magnets separated by a gap having a fixed distance, the first and second magnets establishing a magnetic field across the gap; a ferromagnetic yoke surrounding the first and second magnets, the yoke extending between a ferromagnetic front cover and a ferromagnetic rear cover, each of the front cover and the rear cover comprising a canal extending through the front and rear cover from an inner surface adjacent to the gap to an outer surface opposite the gap, the canals of the front and rear covers axially aligned with each other and the gap when the first and second magnets are enclosed within the yoke and front and rear covers, and aligned with the X-ray detector; and a removable entrance aperture detachably attached to the front cover, the entrance aperture comprising an opening aligned with the canal of the front cover, the opening configured to limit ions entering the magnetic deflector through the entrance aperture to a specified conical region within the gap, where a direction of trajectory of an ion entering the magnetic deflector is altered by the magnetic field as it travels through the gap and a direction of X-rays passing through the magnetic deflector are not altered by the magnetic field.

In one or more aspects, the magnetic deflector can further comprise a plurality of alignment spacers configured to align the first and second magnets within the yoke, wherein the plurality of alignment spacers are nonmagnetic. The plurality of alignment spacers can be positioned between the first and second magnets and sidewalls of the yoke to secure the first and second magnets in position without epoxy or adhesive. At least a portion of the plurality of alignment spacers can be configured to maintain the fixed distance of the gap between the first and second magnets. Individual alignment spacers of the at least a portion of the plurality of alignment spacers can comprise a shoulder that maintains the fixed distance of the gap between the first and second magnets. In some aspects, the magnetic deflector can further comprise an isolating spacer adjacent to the outer surface of the rear cover, the isolating spacer configured to electrically isolate the magnetic deflector from a detector positioned adjacent to the rear cover. The isolating spacer can be a Teflon spacer.

In various aspects, the yoke can comprise first and second portions having a U-shaped cross-section, wherein sidewalls of the first and second portions align to surround the first and second magnets. The front cover can comprise a recess in the outer surface configured to receive the removable entrance aperture, the recess aligned with the canal extending through the front cover. The magnetic deflector can comprise a removable exit aperture detachably attached to the rear cover, the exit aperture comprising an opening aligned with the canal of the rear cover, the opening configured to limit ions exiting the magnetic deflector through the exit aperture. The opening of the exit aperture can be substantially aligned with the opening of the entrance aperture. The magnetic deflector can comprise a mounting plate detachably attached to the rear cover. The magnetic field can be substantially uniform along a length of the first and second magnets. The magnetic field can be about 0.8 T or greater.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 illustrates an example of proton-induced X-ray emission (PIXE), in accordance with various embodiments of the present disclosure.

FIGS. 2A and 2B illustrate examples of a typical PIXE setup with an absorber and a low-Z PIXE setup with a magnetic deflector, in accordance with various embodiments of the present disclosure.

DETAILED DESCRIPTION

Figure 3:
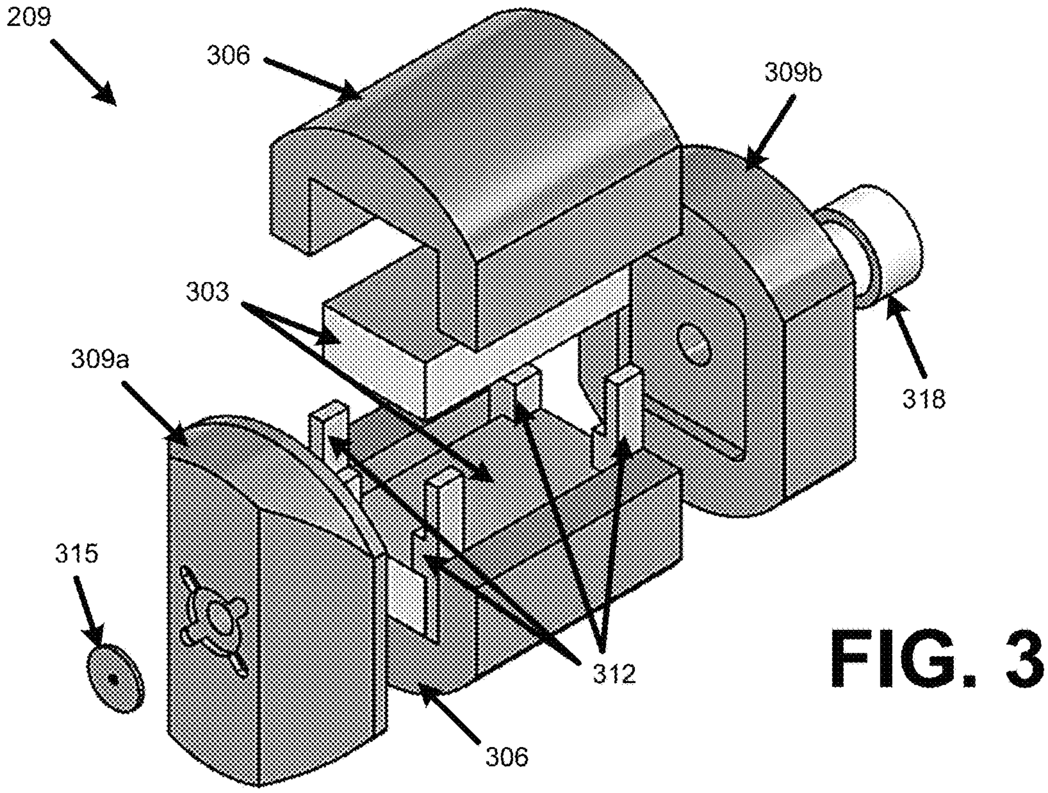
FIGS. 3 and 4A-4B illustrate examples of magnetic deflectors, in accordance with various embodiments of the present disclosure.

Disclosed herein are various examples related to magnetic deflectors and their use in, e.g., proton-induced X-ray emission (PIXE) spectroscopy. A new technique has been developed which allows the detection and measurement of X-rays from light elements which can be particularly useful for biological applications. Reference will now be made in detail to the description of the embodiments as illustrated in the drawings, wherein like reference numbers indicate like parts throughout the several views.

Proton-induced X-ray emission (PIXE) spectroscopy is a long-established method of nondestructive elemental analysis for materials. PIXE has proven to be a reliable and sensitive technique for the detection and quantification of trace elements with atomic numbers in the range of 13-92. PIXE relies upon the relatively high probability that an energetic (1-3 MeV) ion (usually a proton) can undergo an inelastic collision with the electrons in an atom that results in the ionization of an inner-shell electron. The resulting vacancy will be filled by other electrons cascading from higher shells, releasing energy that can be emitted as one or more x-rays characteristic of the atom from which it originates. The physical process of PIXE is illustrated in FIG. 1.

A solid-state x-ray detector can be utilized to record x-ray spectra resulting from samples bombarded by the high energy (1-3 MeV) protons. Detecting and quantifying these characteristic X-rays can provide information to determine elemental constituents and the quantity of those constituents in a sample with the identified peaks in the spectrum originating from X-rays of specific shells within the atom. The number of X-rays, defined as the yield, detected in a peak corresponding to a particular shell from a specific atom is proportional to the concentration of that atom in the sample.

The need to detect low energy X-rays below 1 keV has led to the development of ultra-thin windows for use with a variety of X-ray detectors. The traditional Be window used for solid state X-ray detectors can be replaced with thinner, more X-ray transparent material such as polymer, graphenic carbon, diamond or silicon nitride. These new ultra-thin windows can allow for the detection of elements down to carbon and in some cases lithium while maintaining the detector's vacuum environment. With PIXE however, protons scattered from the sample backward into the detector can cause damage to the detector, thereby substantially reducing the detector lifetime. The energy released from each backscattered ion can overwhelm the detector's preamplifier as they travel through the detector, causing it to reset and increase system deadtime. These backscattered ions can damage the detector and entry window over time, drastically reducing its efficiency, resolution and overall lifetime.

The standard procedure to protect the detector the backscattered protons is to insert an absorber between the sample and the detector. With an absorber of appropriate thickness placed before the entry window, the backscattered ions can be effectively eliminated. FIG. 2A illustrates an example of a typical PIXE setup with an absorber 203 of appropriate thickness (e.g., 80 mm-thick C-filled polyethylene) in place to eliminate most of the backscattered protons from reaching the x-ray detector 206 (e.g., Amptek 70 $mm^2$ Fast SDD, energy resolution: 125 eV @ 5.9 keV (55Fe), window: 30 nm Al on 40 nm $Si_3N_4$, acceptance angle: 3.4 msr). However, the absorber 203 also prevents low energy x-rays emitted from low-Z elements such as sodium, oxygen, fluorine from reaching the detector 206. These low-Z elements are particularly important for biological and environmental applications.

In order to enable the detection low energy x-rays and the subsequent quantification of low-Z elements in samples, a uniquely designed magnetic deflector 209 is utilized to deflect protons away from the detector 206 as shown in FIG. 2B and eliminate the need for an absorber 203 as shown in FIG. 2A. As shown in FIG. 2B, the magnetic deflector 209 can be installed inside the vacuum chamber between the front of the X-ray detector 206 and the target without compromising detection efficiency or solid angle. By deflecting backscattered ions away from the entrance window with the use of a magnetic field, the need for an absorber 203 is eliminated, allowing for X-rays over a wider energy range to enter the detector 206 without introducing ion damage to the detector 206. The magnetic deflector 209 can be used in a vacuum system or in air, is essentially detector independent, includes variable entrance and exit apertures, completely shields the magnetic field, and can be used for broad beam or microprobe applications.

Magnetic Deflector Design

Referring to FIG. 3, shown is an exploded view of an example of a magnetic deflector 209. The design of the magnetic deflector is centered around two magnets 303 (e.g., N52 NdFeB permanent magnets) separated by a gap determined by an inner diameter of an internal collimator of the X-ray detector 206. The magnets 303 can be selected to satisfy the needs of the PIXE system. For example, the magnets 303 can provide an average field of 0.8 T or more at the center of the gap. To contain the magnetic field within the desired area and prevent unwanted steering of the incoming ion beam by fringe fields, the magnets 303 are enclosed by a ferromagnetic yoke 306 and two ferromagnetic end covers—front cover 309*a* and rear cover 309*b*—which can be composed of 416 stainless steel. This grade of magnetic stainless steel was chosen for its corrosion resistance, machinability, and low cost, however other suitable ferromagnetic materials can be used. The yokes 306 have a U-shaped cross-section having sidewalls that can be aligned to form a hollow interior in which the magnets 303 are positioned to form the gap therebetween. Nonmagnetic alignment spacers 312 can be used to align the magnets 303 within the sidewalls of the yokes 306 and can include shoulders to maintain a fixed gap distance between the magnets 303. The ferromagnetic yoke 306 and end covers 309 define a homogeneous magnetic field along the deflector and shield the chamber, incoming ion beam and other sensitive instruments from the magnetic field.

The front cover 309*a* and rear cover 309*b* include channels, passages or canals that extend through the covers to align with the gap between the magnets 303 thereby allowing x-rays to pass through the magnetic deflector 209. A removable entrance aperture 315 located in the front cover 309*a* limits the backscattered ions to a specific conical region. The dimensions of the entrance aperture 315 can be based upon the solid angle of the X-ray detector 206 or optional exit aperture 321. The radius of the entrance aperture 315 is calculated using the angle of half the solid angle's apex, the radius of the detector 206 or optional exit aperture 321 and its distance from the target location, and the distance of the entrance aperture 315 from the target location. As shown in FIG. 3, the entrance aperture 315 can be positioned within a recess in the face of the front cover 309*a* to align the opening with the channel, passage or canal extending through the front cover 309*a*. The alignment spacers 312 can be used to keep the magnets 303 from shifting around after assembly, which eliminates the need for epoxies to secure the magnets in place. An isolating spacer 318 (e.g., a Teflon spacer or other suitable electrically isolating spacer) electrically isolates the magnetic deflector 209 from the X-ray detector 206 to prevent possible noise from ground loops, and it also protects the detector window during the assembly and alignment process within the vacuum chamber.

Figure 4A:
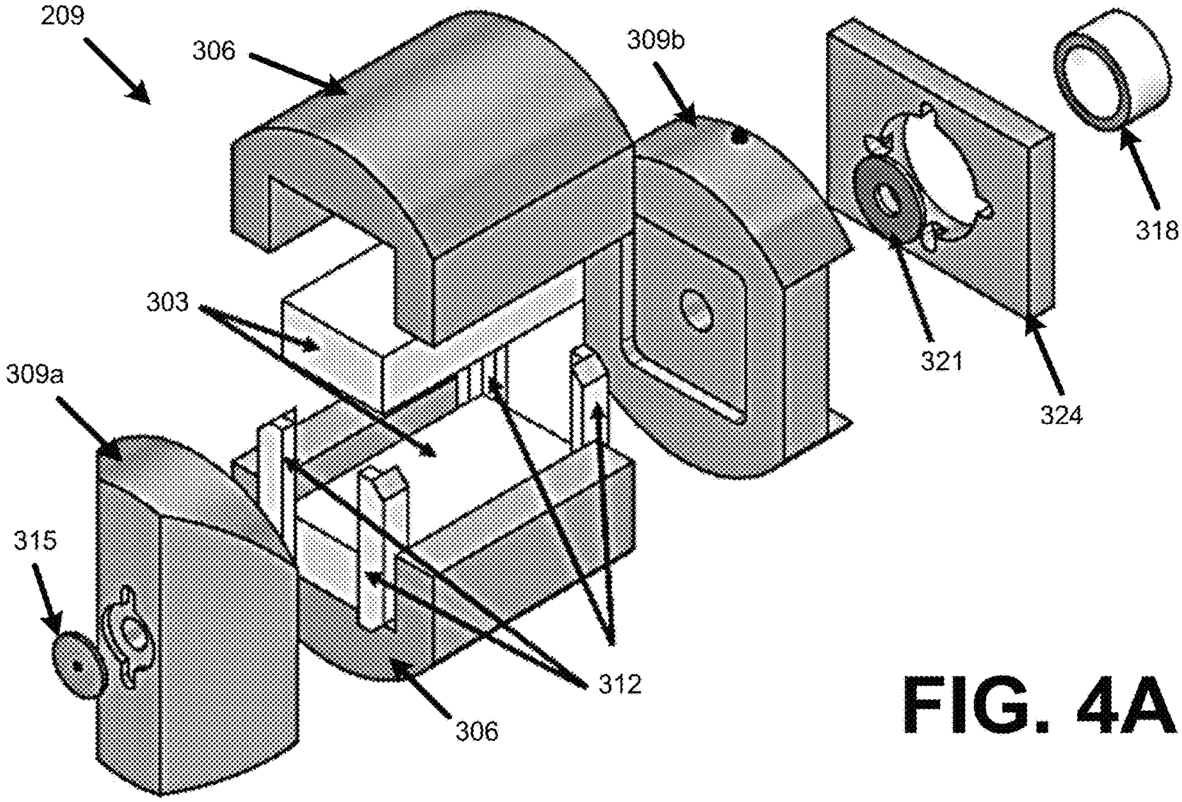
Figure 4B:
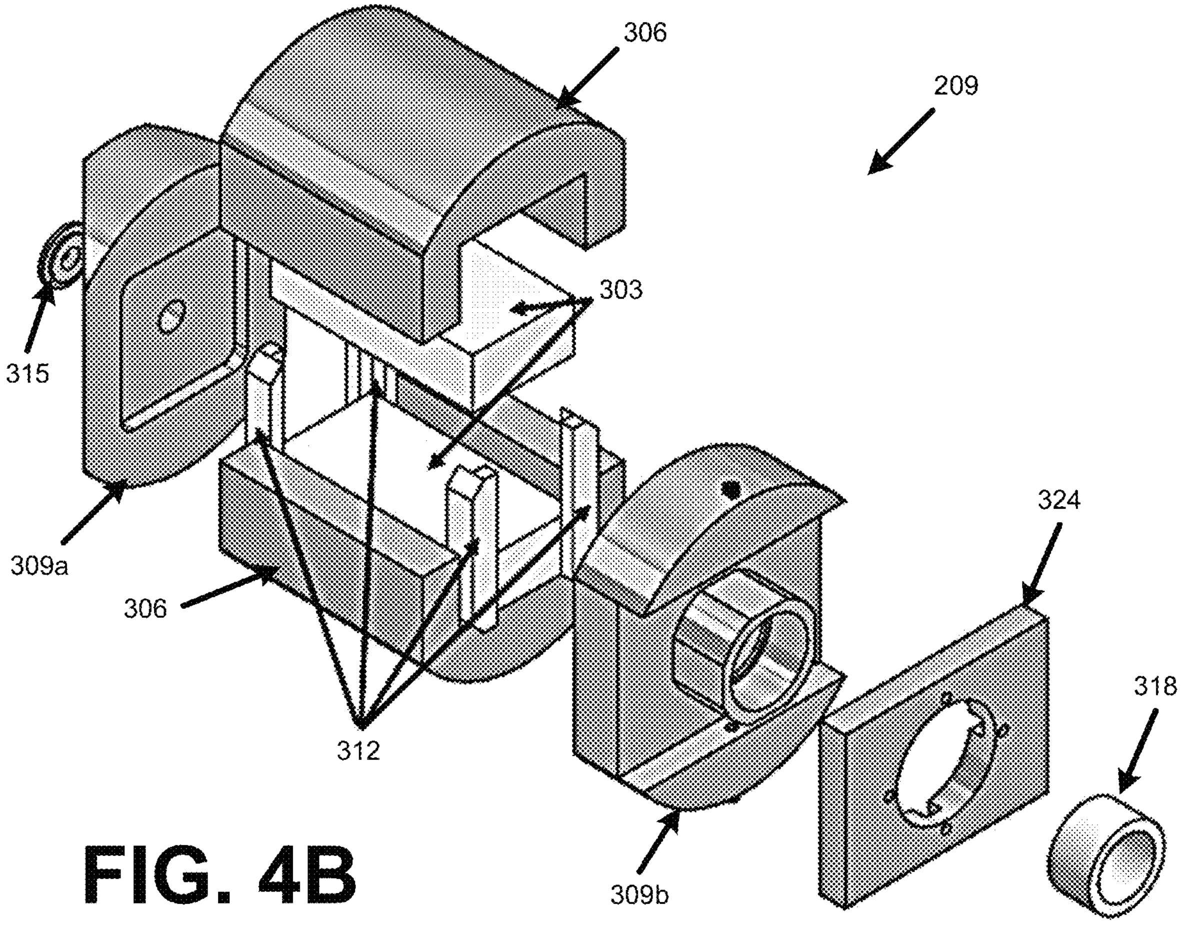

FIGS. 4A and 4B are front and rear exploded views illustrating another example of a magnetic deflector 209 comprising magnets 303 separated by a gap as in FIG. 3. The magnets 303 are enclosed by a ferromagnetic yoke 306 and two ferromagnetic end covers—front cover 309*a* and rear cover 309*b*—with nonmagnetic alignment spacers 312 used to align the magnets 303 within the sidewalls of the yokes 306 without the need for epoxies or other adhesives. A removable entrance aperture 315 limits backscattered ions to a specific conical path and helps define the detector solid angle. The high powered magnets 303 steer incoming backscattered ions away from the X-ray detector 206. The isolating spacer 318 electrically isolates the magnetic deflector 209 from the X-ray detector 206 to prevent possible noise from ground-loops and protect the detector window during the assembly and alignment process within the vacuum chamber.

The magnetic deflector 209 of FIGS. 4A and 4B includes an optional exit aperture 321 to further limit the portion of active area of the detector 206 used for the purposes of utilizing higher energy ion beams during analysis runs. The magnetic deflector 209 can also include a mounting plate 324 for securing the magnetic deflector 206 in the vacuum chamber. The mounting plate 324 allows for easy installation and/or removal of the magnetic deflector 209 and permits insertion of the X-ray detector 206 through central hole when a standard PIXE is needed. The mounting plate 324 can be detachably attached to the rear cover 309*b* using, e.g., set screws or other appropriate fasteners.

Magnetic Deflector Theory and Modeling

Figure 5A:
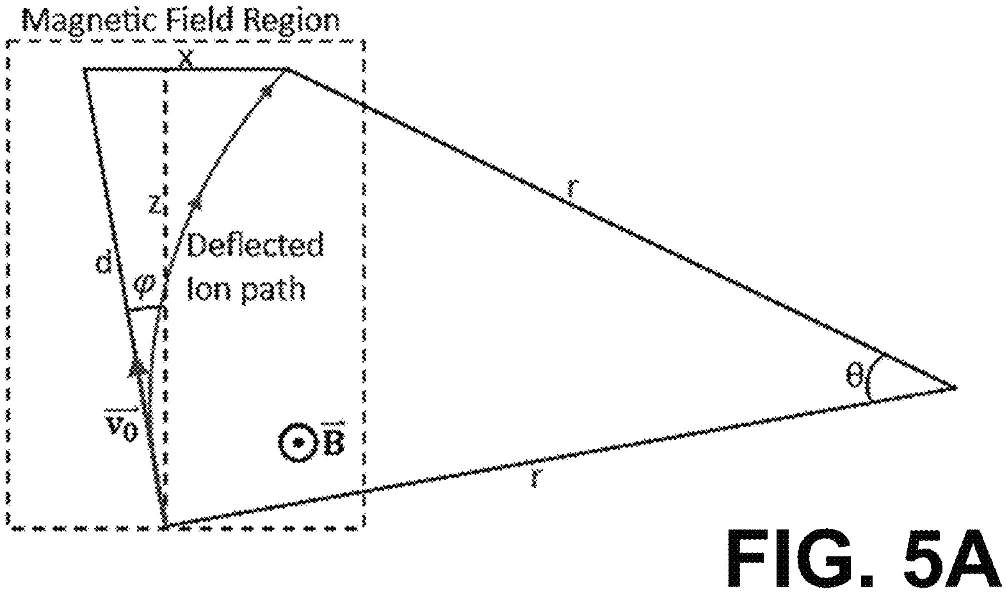
FIGS. 5A and 5B illustrate an example of a positively charged ion traveling path through a magnetic field and FEMM simulation of a magnetic deflector, in accordance with various embodiments of the present disclosure.

As an ion with an initial velocity, $\vec{v_0}$, traverses a magnetic field, B, the magnetic force acting on the ion causes it to travel in a circular motion perpendicular to B and in the plane of its $\vec{v_0}$. FIG. 5A illustrates the circular path along which the ion (with the initial velocity of $\vec{v_0}$) traverses in a region with a length of z where the magnetic field, $\vec{B}$, is perpendicular to the ion trajectory and directed out of the page.

The radius, r, of the circular path is defined by the equation:

$$r = \frac{\sqrt{E^2 - E_0^2}}{|q|Bc}, \tag{1}$$

where E is the sum of the ion beam energy and the ion rest energy, $E_0$. B is the magnetic flux density perpendicular to ion's path of motion, q is the charge of the ion. and c is the speed of light in a vacuum, ($3\times10^{-8}$ m/s). The radius of the ion's trajectory, length of the magnetic field region, z, and initial entry angle, φ, can be used to determine the amount of deflection, x, caused by the magnetic field. The equation derived for use in determining the deflection is:

$$x = \frac{\sqrt{E^2 - E_0^2}}{|q|Bc}\cos\varphi + z\tan\varphi - \sqrt{\frac{E^2 - E_0^2}{(|q|Bc)^2}\cos^2\varphi + 2\frac{\sqrt{E^2 - E_0^2}}{|q|Bc}z\sin\varphi - z^2}. \tag{2}$$

Determining the magnetic flux density utilizes a different approach, as the value of B varies per location and can be influenced by the magnets and shape of the ferromagnetic yoke. For example, Finite Element Method Magnetics (FEMM) can be used to simulate the lateral cross-section of various designs to determine an optimal design which can produce a uniform magnetic field along the ion's travel path. FEMM is an open source software package which utilizes finite element analysis to solve 2D and axisymmetric electromagnetic and steady state heat flow problems.

Figure 5B:
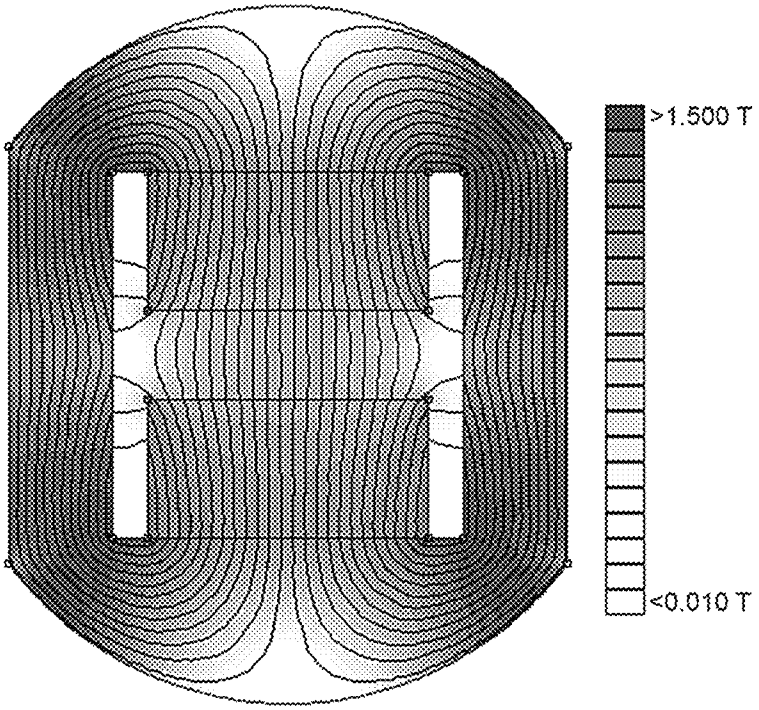

Once the general design is decided upon, yoke thickness and spacing can be adjusted to maximize the magnetic flux density while allowing full use of the X-ray detector 206. FIG. 5B shows the lateral-cross-section of a finalized design for the prototype deflector 206. For each point within the model, the magnetic flux density results can be extracted for comparison to experimental measurements later.

Magnetic Deflector Validation

Figure 6:
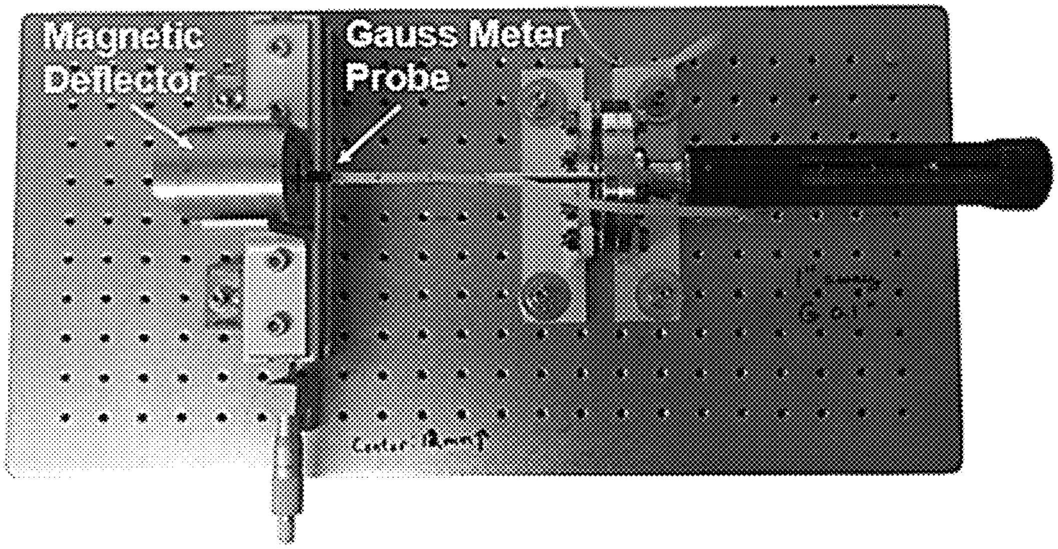
FIG. 6 is an image of a benchtop test station for measuring the magnetic flux density of the magnetic deflector, in accordance with various embodiments of the present disclosure.

A prototype magnetic deflector 206 was assembled and tested for validation of the design. The magnetic field strength was measured for comparison to the simulated values from FEMM. For this purpose, a benchtop test station was assembled using a small laser table, two linear manipulators, a T-slotted rail and miscellaneous hardware. A USB-ST1 Micromag USB Gauss Meter was used to measure the magnetic flux density. This single-axis gauss meter has a 2×2 $mm^2$ detector with a ±19,999 G range, 1 G resolution and ±2% accuracy. FIG. 6 is an image showing the fully assembled test station. The test station allows for both longitudinal and lateral measurements of the prototype deflector without repositioning, although lateral measurements require the removal of the end cover facing the gauss meter. For comparison to simulated values from FEMM, measurements were conducted along the longitudinal and lateral axes with the gauss meter's sensor placed equidistant to both magnets within the deflection region.

Figure 7:
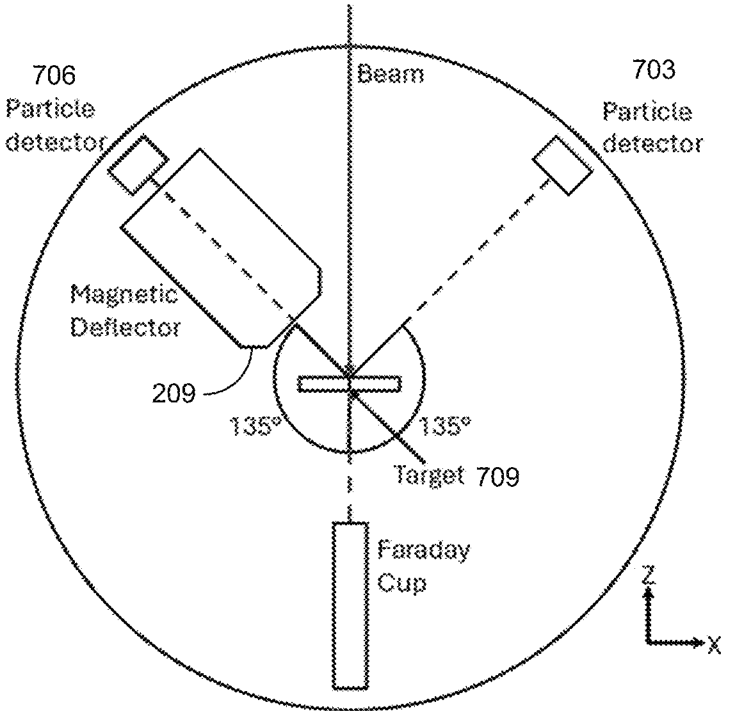
FIG. 7 illustrates an experimental setup used for backscattered proton deflection testing of the magnetic deflector, in accordance with various embodiments of the present disclosure.

Proton Deflection. Backscattered proton deflection testing was conducted in the general purpose endstation of the National Electrostatic Corporation (NEC) 3 MV 9SH single-ended Pelletron. The experimental setup in the endstation chamber is shown in FIG. 7. Two particle detectors were symmetrically placed 135° relative to the incoming proton beam direction. A Canberra passivated implanted planar silicon (PIPS) detector 703 with a 50 $mm^2$ active area was placed on the side without the magnetic deflector 209 for proton Rutherford Backscattering Spectrometry (RBS), while an Ortec ULTRA ion implanted detector 706 with a 100 $mm^2$ active area was placed behind the magnetic deflector 209 to simultaneously investigate its deflection capabilities.

As the detector mount restricted it to a distance located further away from the target than the X-ray detector 206, a detector 706 with a larger active area was chosen to ensure all backscattered protons could be detected. All targets 709 were mounted to a manual XYZ-stage. A thick silicon target 709 with a 240 nm gold layer and 70 nm intermediary titanium adhesion layer was chosen for testing. At a 135° scattering angle, gold has a kinematic factor of 0.9827. The incoming proton beam energy was set to 1.000 MeV for the initial test run and was increased by 100 keV for each subsequent run until the backscattered protons were no longer deflected. The beam energy was then reduced in 10 keV increments until the full deflection occurred again.

Light Element PIXE. In preparation for testing the light element PIXE system, the particle detector 706 after the magnetic deflector 209 was removed, and in its place, an Amptek 70 $mm^2$ X-123 Fast silicon drift detector (SDD) X-ray detector 206 was mounted. The X-ray detector 206 was internally collimated to 50 $mm^2$ and comes with Amptek's patented C2 entry window, which allowed for the transmission of lithium X-rays to the SDD. C2 windows were 40 nm thick silicon nitride windows with a 30 nm aluminum coating. The window was affixed to a 15 μm thick hexagonal silicon grid which reduced the open area for X-ray transmission to 80% of the original. Control of the X-ray detector and data acquisition was handled by Amptek's DPPMCA Display and Acquisition Software. For testing purposes, no changes were made to the detector's default settings. With the magnetic deflector 209 in place, the X-ray detector 206 was 118.4 mm away from the targets, providing a solid angle of 3.59 msr. To maintain this solid angle, no adjustments along the Z-axis were made to the stage when positioning samples. Due to the entrance aperture and shielding provided by the deflector's yoke 306 and front cover 309*a*, all entering X-rays travel directly to the internally collimated active area of the detector 206. The energy of the proton beam was selected based on the results of the particle deflection tests.

A variety of organic and inorganic samples containing low-Z elements were studied to test the detection capabilities of the light element PIXE system of low energy (<1 keV) X-rays. A manganese oxide thick target of unknown chemical composition was used for confirming the ability to see oxygen and carbon from possible contaminants. It was also used in determining the detector resolution at 5.899 keV (Mn Kα) and 0.523 keV (O Kα) and setting the energy calibration for subsequent spectra. Once the ability to see elements below aluminum was confirmed, a sodium chloride crystal was analyzed to study the system's accuracy at determining the atomic ratios between elements within a sample. Sodium chloride was primarily chosen due to the importance of sodium in biological systems. A pressed pellet of D-(+)-glucose, the most abundant carbohydrate and source of energy in cell function, with a chemical formula of $C_6H_{12}O_6$ was also analyzed as part of studying atomic ratios. As a complete test of the system, a section from a green hibiscus (Hibiscus rosa-sinenesis) leaf was analyzed, and its elemental concentrations were determined. The final sample investigated was a 10 μm thick section of rat brain supported by a 2 μm polycarbonate backing film. This was chosen due to previous analysis revealing no detectable trace elements above copper. The rat brain section was also analyzed using standard PIXE with the same beam energy and an 80 μm thick carbon-filled polyethylene absorber for blocking backscattered particles. This was done to investigate and compare the differences in results between the two experimental setups.

Results and Discussion

Figure 8:
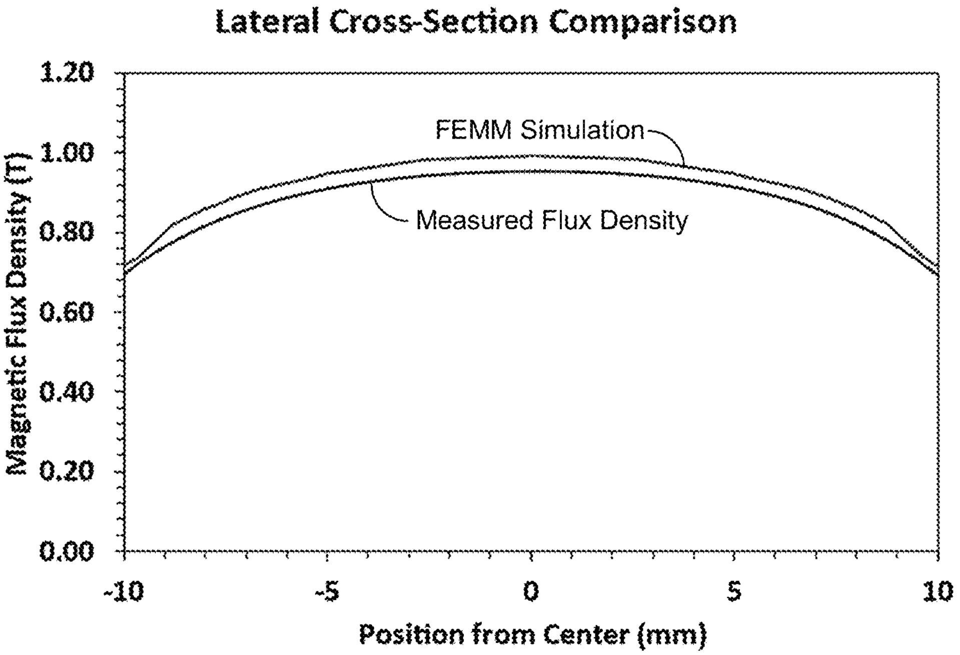
FIG. 8 illustrates a comparison between FEMM simulated and measured magnetic field strength of a lateral cross-section of the magnetic deflector, in accordance with various embodiments of the present disclosure.

Magnetic Flux Density. FIG. 8 shows a comparison between the measured magnetic field strength values obtained and the simulated values from FEMM along the central lateral cross-section (perpendicular to the x-ray path at the center of the deflector) along a line equidistant from both permanent magnets. Due to space limitations brought on by the size of the gauss meter tip and its mount, measurements were restricted to a central 20 mm range along the central region between the magnets. However, this did not present an issue, as the region where deflection occurs is within the central 8 mm range. Within this range, the magnetic field remained perpendicular to the ion path, and the magnetic flux density ranged from 0.92 T on the edges of the region to a maximum of 0.95 T in the center. The simulated results from FEMM tracked well with the measured results, but they tended to be approximately 50 mT higher than the measured values.

Figure 9:
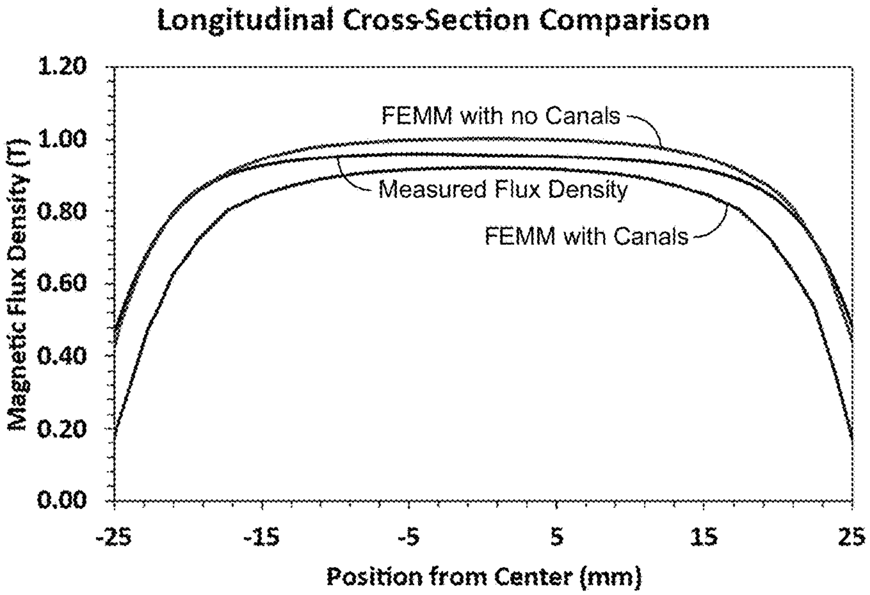
FIG. 9 illustrates a comparison between FEMM simulated and measured magnetic field strength of a longitudinal cross-section of the magnetic deflector, in accordance with various embodiments of the present disclosure.

The measured and simulated results for the centrally located longitudinal cross-section are presented in FIG. 9. Two models of the magnetic deflector's longitudinal cross-section were created in FEMM. One model omitted the entry and exit canals of the end covers, while the second model included them. The simulated results from both models deviated from the measured values as the distance from center increased, but there was a greater overall discrepancy when the canals were modeled. On average, simulated results with the canals were 120 mT lower than those with canals omitted and 50 mT lower at the central point when compared to the measured values. Simulated results without the canals were 50 mT higher than the measured values around the central point. The measured values across the entire length of the magnets averaged out to 0.88 T. According to eqn. (2), this is sufficient to deflect a 1 MeV proton 8 mm within the magnetic field between the two magnets.

The higher simulated results for the lateral and longitudinal cross-sections may be attributed to not accounting for manufacturing tolerances during simulation. The 15-21 μm thickness of each magnet's nickel-copper-nickel plating was also neglected in the model, which may have contributed to the higher simulated magnetic flux density. During assembly, some of the corners of the magnets were slightly damaged, which could cause a reduction in magnetic flux density. Despite the difference between simulated and experimental results, FEMM still proved to be a useful aid in the design process of the magnetic deflector 209.

Figure 10A:
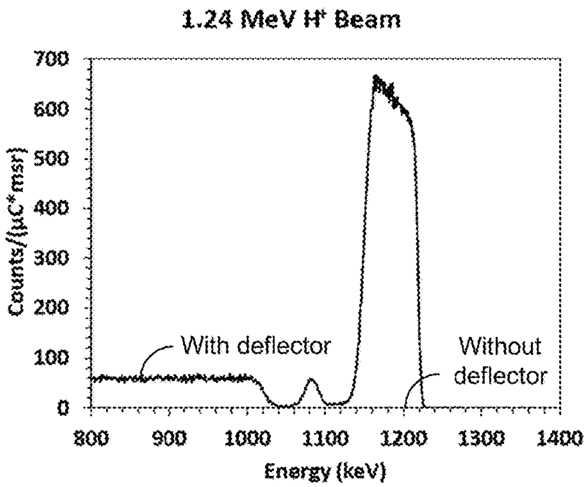
FIGS. 10A and 10B illustrate a comparison of RBS spectra of the Au on Si target between two particle detectors (with and without the light ion magnetic deflector prototype) where the deflector steers away all backscattered protons at a beam energy of 1.240 MeV and some of the backscattered protons reach the detector 1.250 MeV, in accordance with various embodiments of the present disclosure.
Figure 10B:
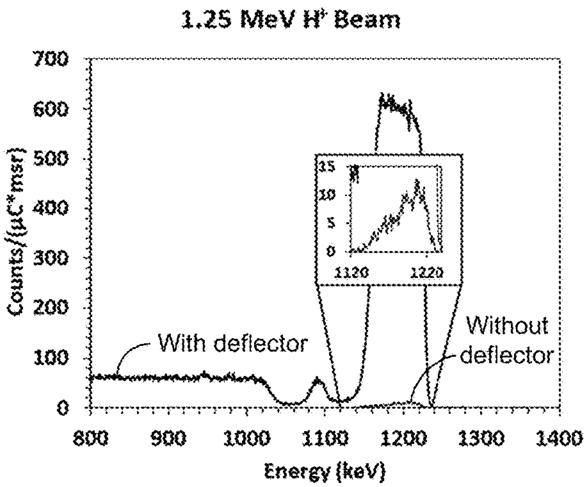

Proton Deflection. With an initial beam energy of 1.000 MeV, all backscattered protons entering the magnetic deflector were successfully steered away from the particle detector. This trend continued with each incremental beam energy increase of 100 keV up to 1.240 MeV. FIGS. 10A and 10B illustrate a comparison of RBS spectra of the Au on Si target between the two particle detectors (with and without the light ion magnetic deflector prototype). FIG. 10A compares spectra between the particle detector after the magnetic deflector and the particle detector opposite it. Once increased to 1.250 MeV, some protons began entering the particle detector, which can be seen in FIG. 10B. Using the kinematic factor of gold, it was determined the magnetic deflector can deflect backscattered particles of 1.219 MeV or less.

Figure 11:
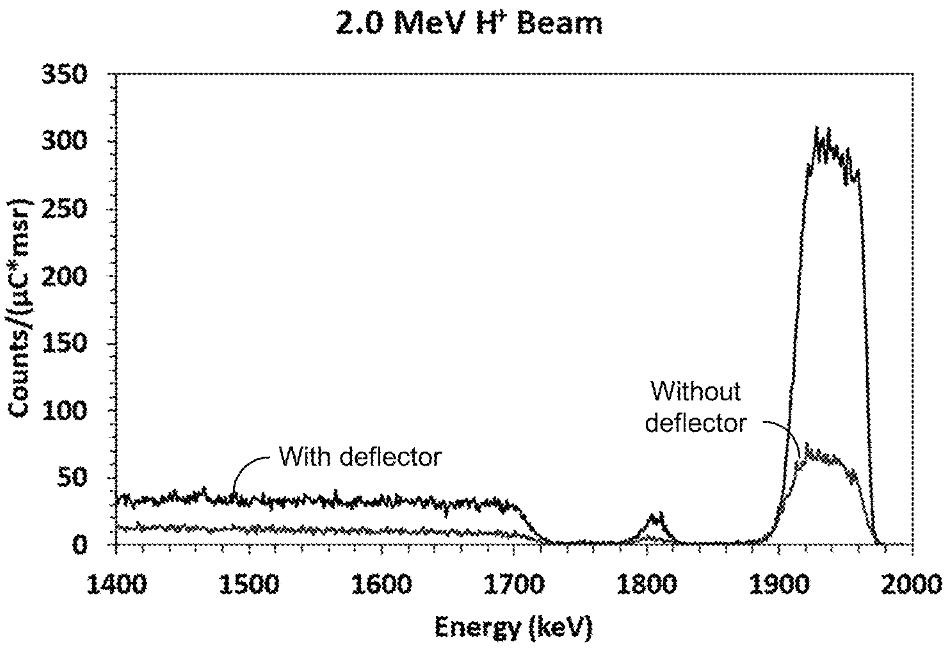
FIG. 11 illustrates a particle deflection test at 2 MeV where most backscattered particles are still deflected, in accordance with various embodiments of the present disclosure.

FIG. 11 shows the results of the particle deflection tests at the beam energy of 2.000 MeV. While particles are reaching the particle detector 206 after the magnetic deflector 209, a large majority of them are still being deflected. This indicates it is possible to slightly modify the system configuration to allow for operation at the higher beam energy. An exit aperture 321 (FIG. 4A) can be added at the rear cover 309*b* to reduce the amount of deflection needed. By repositioning the detector 206 to a distance further from the target, the particles would be allowed a longer drift period after leaving the magnetic field at a new exit angle, and the total deflection would be increased. In both cases, the beam energy could be increased at the expense of reducing the detector solid angle.

Figure 12:
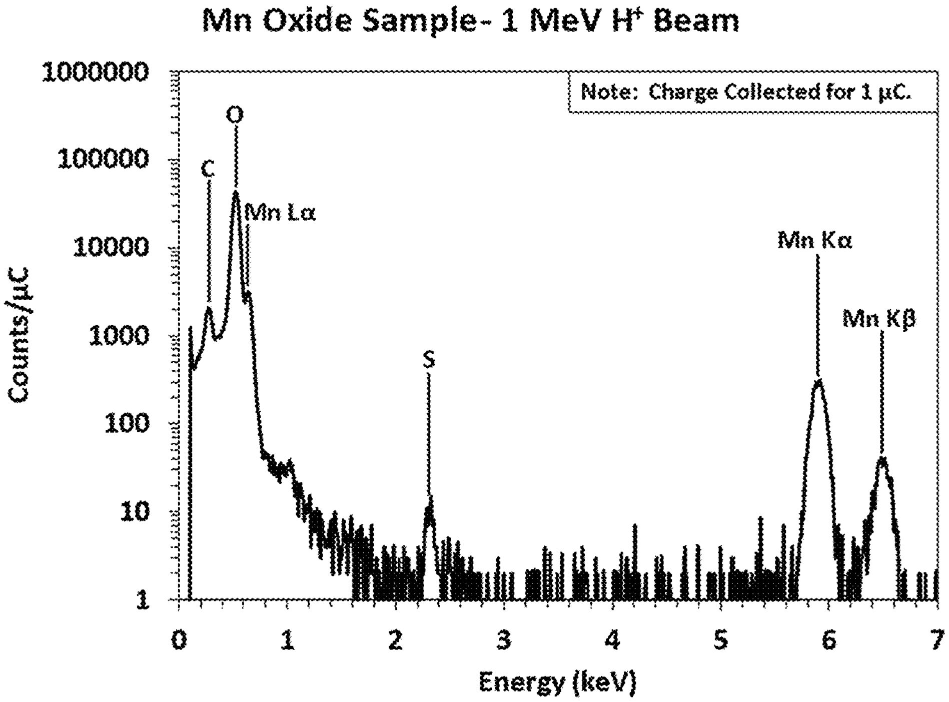
FIG. 12 illustrates an example of a PIXE spectrum obtained from a manganese oxide sample of unknown chemical composition, in accordance with various embodiments of the present disclosure.

Light Element PIXE Analysis. A 1.000 MeV proton beam with a spot size of 0.25 $mm^2$ was chosen for light element PIXE, and the average beam current was 1.5±0.5 nA. Data acquisition, spectra calibration, and determination of detector resolution were performed using Amptek's freely available DPPMCA display and acquisition software. The initial run on the manganese oxide target proved successful in detecting elements down to carbon. FIG. 12 displays the obtained spectrum, which shows good separation between the carbon and oxygen peaks, 0.277 keV and 0.523 keV respectively. In addition, the Mn L X-rays were also visible near 0.640 keV.

Figure 13:
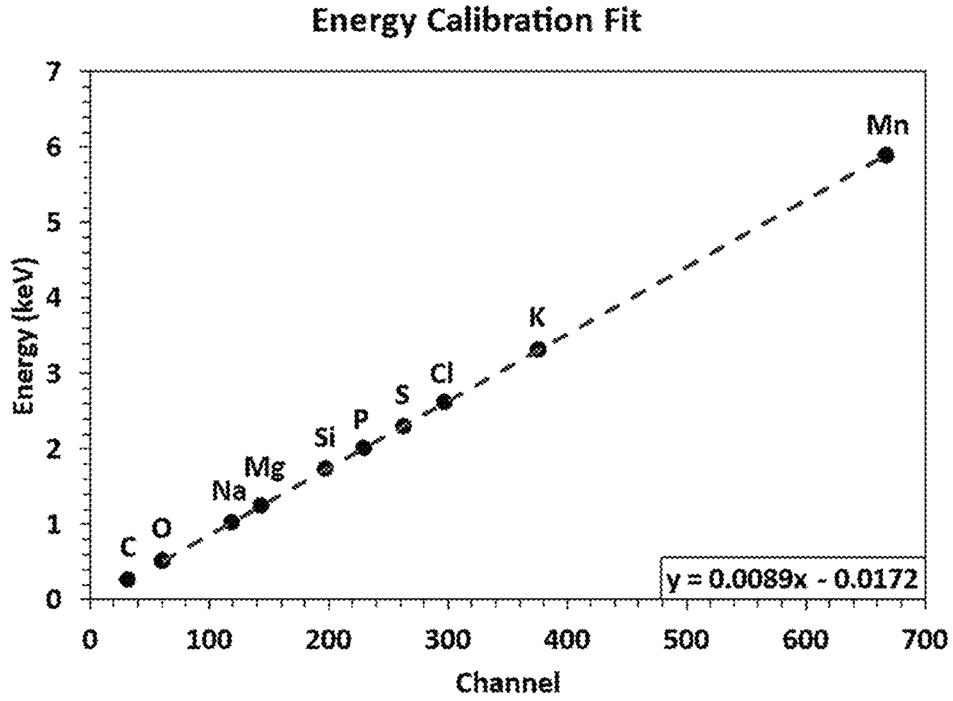
FIG. 13 illustrates an example of a calibration curve of the Amptek X-123 FastSDD using a two point linear fit between the O and Mn Kα peaks, in accordance with various embodiments of the present disclosure.

A linear fit between the O and Mn Kα X-ray peaks was used for energy calibration of this and all subsequent spectra. Additionally, the linearity of the energy calibration was verified using Kα peaks identified in the other samples investigated in this work. A plot of the energy calibration curve for the X-ray detector is found in FIG. 13. Detector resolution is determined by taking the FWHM of a peak at a given energy, typically at 5.899 keV where the Mn Kα peak is located. With a peaking time of 4 μs, the measured resolution at 5.899 keV was found to be 120 eV. At lower energies, the resolution of the detector improves, with a resolution of 60 eV at 0.277 keV and 61 eV at 0.523 keV. However, subsequent FWHM measurements for later samples showed fluctuations in the detector's resolution at lower energies. At 0.277 keV, the resolution varied between 47 eV and 60 eV while the resolution at 5.899 keV remained 120 eV. This fluctuation in resolution may be attributed to the presence of intermittent electronic noise in the system during some of the experimental runs. All settings for the X-ray detector were left at their factory defaults, which allows for a detection range of 0.102 keV to 9.03 keV.

Figure 14:
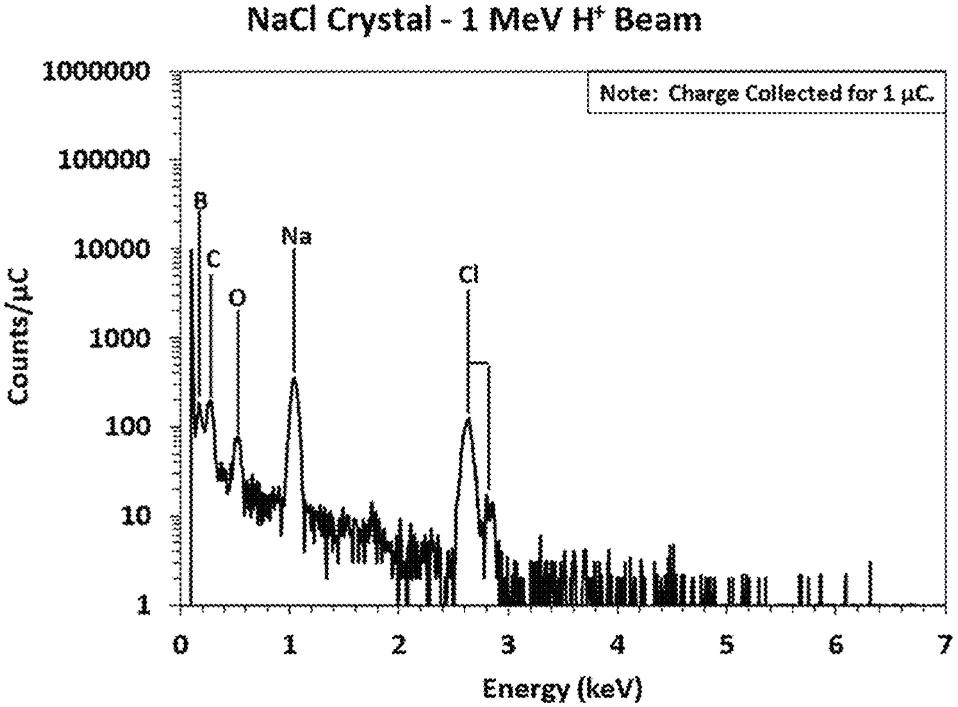
FIG. 14 illustrates an example of a PIXE spectrum obtained from a sodium chloride crystal with Boron (0.185 keV) detectable within the sample, in accordance with various embodiments of the present disclosure.

When analyzing the sodium chloride crystal, the light element PIXE system could detect trace concentrations of boron (0.185 keV) without difficulty. FIG. 14 shows the boron peak located between the carbon peak and a noise peak at the lowest energies. Unfortunately, this noise would hinder the detection of lighter elements and should be resolved before making alterations to the detector's electronics settings to allow for the detection of elements lighter than boron. The noise peak is likely a combination of ion beam induced luminescence of the sample and intermittent electronic noise due to bad grounding or shielding of a component on the accelerator or beamline.

GeoPIXE 7.5r software was used for quantification of the spectrum, and the relative mass and atomic concentrations for all quantifiable elements are listed in Table 1. GeoPIXE was not designed to quantify any element below 0.200 keV, which prevented the determination of the amount of boron detected. Sodium and chlorine concentrations were very low given they were the primary elements in the target. The reduction in concentration is likely the result of ion beam induced luminescence of the target. The ultra-thin C2 window of the X-ray detector is not a light tight design. Thus, the light emitted from the target during ion beam interaction overwhelms the detector, causing it to reset more frequently while preventing it from processing incoming X-rays. Despite this issue and the presence of other contaminants, the atomic ratio of sodium to chlorine is 0.97:1, which is within the range of uncertainty.

TABLE 1

Mass and atomic concentration of elements found in NaCl crystal.

| | Mass Concentration | | | Atomic Concentration | | |
|---|---|---|---|---|---|---|
| Element | Concentration (ng/mg) | Uncertainty (ng/mg) | Detection Limits (ng/mg) | Concentration (μmol/mol) | Uncertainty (μmol/mol) | Detection Limits (μmol/mol) |
| C | 1320 | 60 | 40 | 6420 | 270 | 190 |
| O | 79 | 6 | 9 | 289 | 22 | 31 |
| Na | 202 | 8 | 2 | 510 | 20 | 6 |
| Cl | 321 | 9 | 4 | 529 | 15 | 6 |

Figure 15:
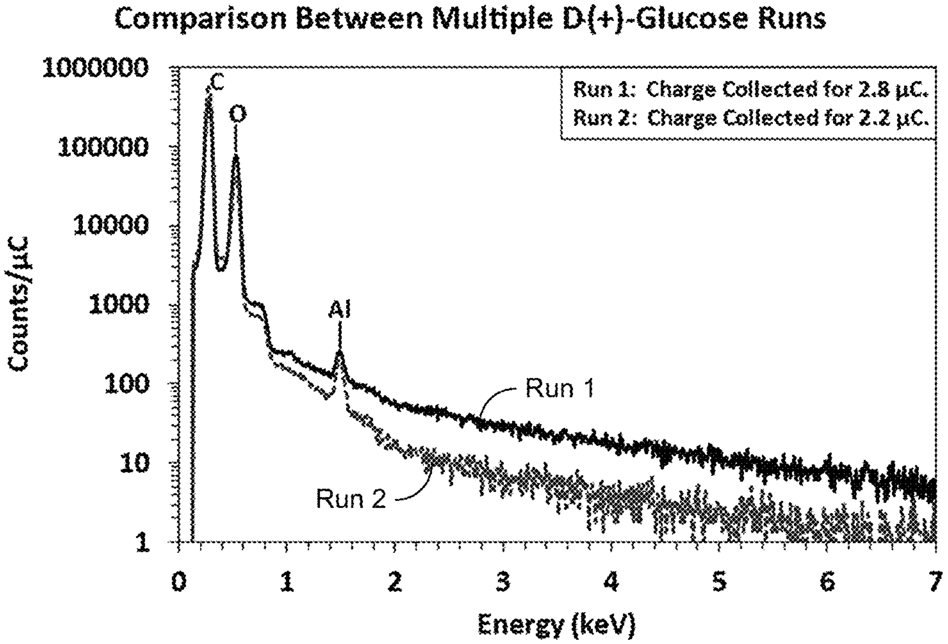
FIG. 15 illustrates a comparison between two D-(+)-Glucose runs, in accordance with various embodiments of the present disclosure.

Issues arose when analyzing the pressed pellet of D-(+)-Glucose. The pellet was found to be insulating at the beginning of the first of two runs performed on it, with it charging up and arcing during the run. As the initial run progressed, the pellet became more conductive as a dark, carbonized layer formed on the surface where the proton beam was irradiating it. Once the first run was completed, a follow-up run was performed, which showed a reduction in background caused by the sample charging up. There was also a noticeable reduction in oxygen, while the amount of carbon appeared to increase. FIG. 15 shows a comparison between the two data runs.

While charge was collected for 2 μC for both data runs, the insulative nature and charging up of the sample interjected a large margin of error into the charge integration. To overcome this, the RBS spectra were analyzed, and the correct charge for each spectrum was extracted. With the correct charge obtained, elemental concentrations were extracted and the ratio of carbon to oxygen was determined for each run and are listed in Table 2. It was confirmed that the sample pellet of D-(+)-Glucose likely began to lose oxygen as the beam of protons interacted with the sample and began breaking molecular bonds. This resulted in change in the carbon to oxygen ratio from 1:1 to 3:1.

TABLE 2

Comparison of atomic concentration of elements in D-(+)-Glucose sample and C to O ratio for each run performed.

| Element | Run 1 Concentration (mmol/mol) | Run 2 Concentration (mmol/mol) |
|---|---|---|
| C | 1470 | 2150 |
| O | 520 | 270 |
| Al | 0.76 | 0.77 |
| C to O Ratio | 3 | 8 |

During the second run, the ratio increased to 8:1, while the relative concentration of carbon increased by 677,592 μmol/mol. This is potentially from free carbon in the vacuum chamber collecting on the surface. Additionally, the concentration for the second run is artificially high due to the use of identical target information in the yield files for each run which did not account for prior elemental loss. While not the focus of this work, it presents a possible use case for measuring elemental concentration loss due to the release of volatiles from ion beam interaction over time. The loss of volatiles in subsequent organic samples was not investigated at this time as the focus was on showing the functionality of the magnetic deflector system.

Figure 16:
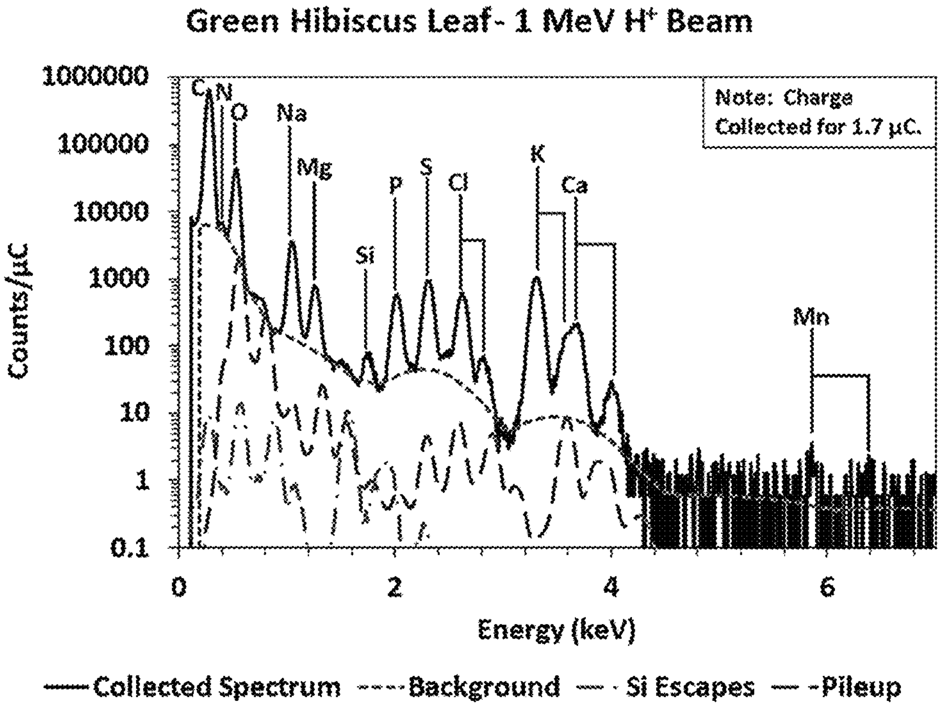
FIG. 16 illustrates an example of a PIXE spectrum along with GEOPIXE analysis of a green hibiscus leaf, in accordance with various embodiments of the present disclosure.

Prior to analysis, the green hibiscus leaf sample was cleaned using DI water and shade dried for 4-5 days to retain the nutrient value. A small section was cut off and mounted on the sample holder. The leaf sample presented less of an issue compared to the glucose sample, although small hair like protrusions called trichomes would luminesce when exposed to the ion beam. Adjusting the sample position resolved this issue and charge collection was not impacted. FIG. 16 shows the obtained spectrum from the data run and includes the background, silicon escapes, and pileup as calculated by GeoPIXE.

The relative concentrations of detected elements can be found in Table 3. For the purposes of this test, cellulose ($C_6H_{10}O_5$) was used for the matrix composition of the leaf sample. Uniform density and thickness were assumed. Because of the presence of carbon, nitrogen, oxygen, sodium and magnesium, the leaf sample proved to be a good sample to showcase the capabilities of the light element PIXE system.

TABLE 3

Elemental concentrations of analyzed region of the green hibiscus leaf sample.

| Element | Concentration (ng/mg) | Uncertainty (ng/mg) | Detection Limits (ng/mg) |
|---|---|---|---|
| C | 160200 | 1200 | 20 |
| N | 1750 | 250 | 90 |
| O | 27400 | 600 | 30 |

theoretically capable of detecting sodium and magnesium, but the detection limit, or minimum detectable limit (MDL), for each far exceeded the amount present in the sample, which was detected with light element PIXE. Concentrations of silicon and aluminum showed a large discrepancy between the different setups, while calcium and iron were very similar for both. Phosphorus, sulfur, chlorine, and potassium varied between the two setups, but elemental ratios between them showed similar trends in their individual runs.

TABLE 4

Comparison between concentrations obtained from standard PIXE and light element PIXE of a rat brain sliced tissue sample.

| | Standard PIXE with 80 μm C-filled Polyethylene Absorber | | | Light Element PIXE with Magnetic Deflector | | |
|---|---|---|---|---|---|---|
| Element | Concentration (ng/mg) | Uncertainty (ng/mg) | Detection Limits (ng/mg) | Concentration (ng/mg) | Uncertainty (ng/mg) | Detection Limits (ng/mg) |
| C | — | — | — | 141000 | 2000 | 8 |
| N | — | — | — | 52000 | 2000 | 40 |
| O | — | — | — | 62700 | 1500 | 27 |
| F | — | — | — | 2480 | 210 | 16 |
| Na | <MDL | 40000 | 70000 | 1830 | 90 | 6 |
| Mg | <MDL | 250 | 500 | 316 | 11 | 5 |
| Al | 100 | 30 | 50 | 37 | 2 | 5 |
| Si | 111 | 12 | 15 | 15 | 3 | 4 |
| P | 6180 | 70 | 11 | 5040 | 110 | 6 |
| S | 2620 | 40 | 10 | 1790 | 50 | 7 |
| Cl | 2950 | 40 | 8 | 2180 | 40 | 8 |
| K | 9020 | 70 | 6 | 6240 | 140 | 8 |
| Ca | 158 | 11 | 8 | 167 | 9 | 9 |
| Fe | 91 | 15 | 23 | 87 | 22 | 24 |

TABLE 3-continued

Elemental concentrations of analyzed region of the green hibiscus leaf sample.

| Element | Concentration (ng/mg) | Uncertainty (ng/mg) | Detection Limits (ng/mg) |
|---|---|---|---|
| Na | 3540 | 90 | 8 |
| Mg | 571 | 22 | 7 |
| Si | 40 | 3 | 4 |
| P | 735 | 9 | 6 |
| S | 1625 | 21 | 9 |
| Cl | 1546 | 25 | 10 |
| K | 5970 | 130 | 11 |
| Ca | 1420 | 30 | 15 |
| Mn | 48 | 18 | 24 |

Figure 17:
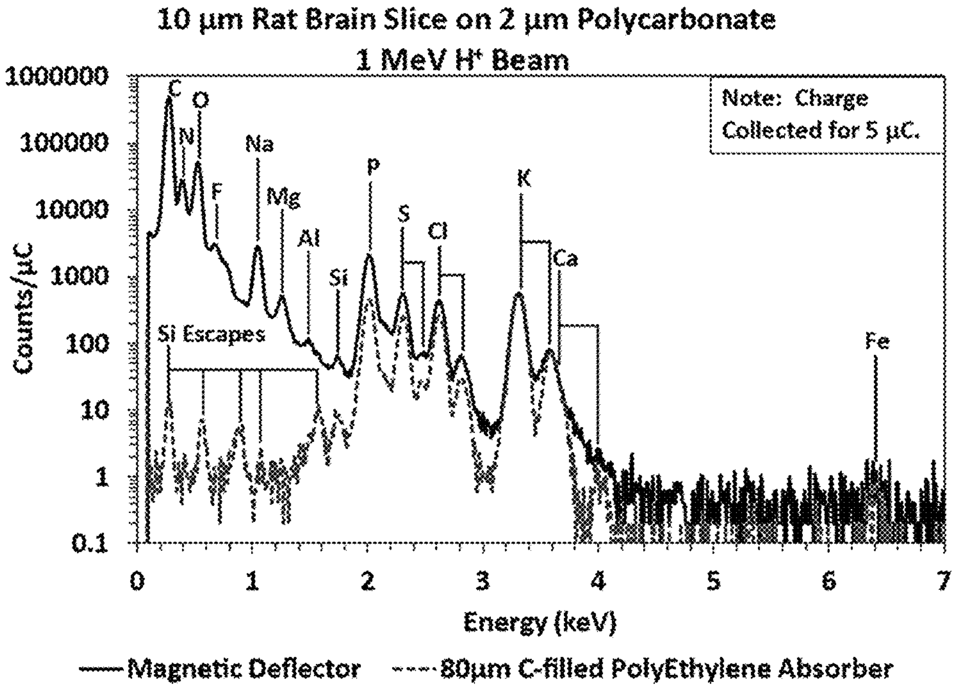
FIG. 17 illustrates a comparison between PIXE spectra of a rat brain sliced tissue sample utilizing the magnetic deflector vs absorber placed before the X-ray detector, in accordance with various embodiments of the present disclosure.

A comparison between a standard PIXE run with an 80 μm thick carbon-filled polyethylene absorber and a light element PIXE run on the 10 μm thick rat brain slice is shown in FIG. 17. As shown in FIG. 17, the absorber performs well at reducing background, especially at lower energies. It also eliminates the ability to detect elements below aluminum. The absorber available for use at the time of the experiment was originally purchased and used to stop 2.0 MeV backscattered protons. A 25 μm thick absorber of the same material would be more suitable for deflecting 1.0 MeV backscattered protons and allow for 1.7% transmission of Na X-rays through to the detector. Unfortunately, this thinner material was not readily available for testing at the time.

Similarly, a comparison between elemental concentrations obtained from both methods is available in Table 4. With the absorber in place, standard PIXE is shown to be The differences in elemental concentrations between experimental runs can be attributed to repeatability of sample positioning. Although the intention was to analyze the same location for both experimental runs, it should be noted that setup between each run needed moving the sample out of position. While the sample was moved as close to the same position as possible, several factors limited exact repositioning to within 30±10 μm. Poor camera resolution, stage repeatability and beam drift are major limiting factors affecting the reanalysis of the same location. Additionally, elemental composition can drastically change in the rat brain tissue over distances >20 μm, which is not a trivial distance for beam spot sizes of <1 $mm^2$. As such, a variation in the elemental composition between these experimental runs was expected.

A prototype magnetic deflector capable of deflecting 1.219 MeV backscattered protons was developed for a light element PIXE system. Several samples were analyzed to test the system and determine its usefulness. The system was found to be capable of detecting elements down to boron in samples, allowing for a nondestructive method of determining the concentration of light elements with a short setup time and run times comparable to standard PIXE for heavier elements. This makes it ideally suited for biological applications involving the study of low-Z elements within very thin or thick, homogenous samples primarily composed of light elements. It is also well suited for investigating surface contamination of trace low-Z elements on a variety of other sample types. The magnetic deflector can be reduced in size for use in a light ion microprobe, and better materials with higher magnetic saturation can be utilized with the yoke.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. When not otherwise defined, "substantially" can mean within a variation of 20% or less. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A magnetic deflector, comprising:

first and second magnets extending substantially parallel to each other, the first and second magnets separated by a gap having a fixed distance, the first and second magnets establishing a magnetic field across the gap;

a ferromagnetic yoke surrounding the first and second magnets, the yoke extending between a ferromagnetic front cover and a ferromagnetic rear cover, each of the front cover and the rear cover comprising a canal extending through the front and rear cover from an inner surface adjacent to the gap to an outer surface opposite the gap, the canals of the front and rear covers axially aligned with each other and the gap when the first and second magnets are enclosed within the yoke and front and rear covers; and a removable entrance aperture detachably attached to the front cover, the entrance aperture comprising an opening aligned with the canal of the front cover, the opening configured to limit ions entering the magnetic deflector through the entrance aperture to a specified conical region within the gap, where a direction of trajectory of an ion entering the magnetic deflector is altered by the magnetic field as it travels through the gap.

2. The magnetic deflector of claim 1, further comprising a plurality of alignment spacers configured to align the first and second magnets within the yoke, wherein the plurality of alignment spacers are nonmagnetic.

3. The magnetic deflector of claim 2, wherein the plurality of alignment spacers are positioned between the first and second magnets and sidewalls of the yoke to secure the first and second magnets in position without epoxy or adhesive.

4. The magnetic deflector of claim 2, wherein at least a portion of the plurality of alignment spacers are configured to maintain the fixed distance of the gap between the first and second magnets.

5. The magnetic deflector of claim 4, wherein individual alignment spacers of the at least a portion of the plurality of alignment spacers comprise a shoulder that maintains the fixed distance of the gap between the first and second magnets.

6. The magnetic deflector of claim 1, further comprising an isolating spacer adjacent to the outer surface of the rear cover, the isolating spacer configured to electrically isolate the magnetic deflector from a detector positioned adjacent to the rear cover.

7. The magnetic deflector of claim 6, wherein the isolating spacer is a Teflon spacer.

8. The magnetic deflector of claim 1, wherein the yoke comprises first and second portions having a U-shaped cross-section, wherein sidewalls of the first and second portions align to surround the first and second magnets.

9. The magnetic deflector of claim 1, wherein the front cover comprises a recess in the outer surface configured to receive the removable entrance aperture, the recess aligned with the canal extending through the front cover.

10. The magnetic deflector of claim 1, comprising a removable exit aperture detachably attached to the rear cover, the exit aperture comprising an opening aligned with the canal of the rear cover, the opening configured to limit ions exiting the magnetic deflector through the exit aperture.

11. The magnetic deflector of claim 10, wherein the opening of the exit aperture is substantially aligned with the opening of the entrance aperture.

12. The magnetic deflector of claim 1, comprising a mounting plate detachably attached to the rear cover.

13. The magnetic deflector of claim 1, wherein the magnetic field is substantially uniform along a length of the first and second magnets.

14. The magnetic deflector of claim 1, wherein the magnetic field is about 0.8 T or greater.

15. A proton-induced X-ray emission (PIXE) spectroscopy system, comprising:

a proton source configured to direct a charged ion beam at a target in a vacuum chamber;

an X-ray detector configured to detect X-ray emissions from the target; and a magnetic deflector positioned between the target and the X-ray detector; the magnetic deflector comprising:

first and second magnets extending substantially parallel to each other, the first and second magnets separated by a gap having a fixed distance, the first and second magnets establishing a magnetic field across the gap;

a ferromagnetic yoke surrounding the first and second magnets, the yoke extending between a ferromagnetic front cover and a ferromagnetic rear cover, each of the front cover and the rear cover comprising a canal extending through the front and rear cover from an inner surface adjacent to the gap to an outer surface opposite the gap, the canals of the front and rear covers axially aligned with each other and the gap when the first and second magnets are enclosed within the yoke and front and rear covers, and aligned with the X-ray detector; and a removable entrance aperture detachably attached to the front cover, the entrance aperture comprising an opening aligned with the canal of the front cover, the opening configured to limit ions entering the magnetic deflector through the entrance aperture to a specified conical region within the gap, where a direction of trajectory of an ion entering the magnetic deflector is altered by the magnetic field as it travels through the gap and a direction of X-rays passing through the magnetic deflector is not altered by the magnetic field.

16. The PIXE spectroscopy system of claim 15, wherein the magnetic deflector comprises a plurality of alignment spacers configured to align the first and second magnets within the yoke, wherein the plurality of alignment spacers are nonmagnetic.

17. The PIXE spectroscopy system of claim 16, wherein the plurality of alignment spacers are positioned between the first and second magnets and sidewalls of the yoke to secure the first and second magnets in position without epoxy or adhesive.

18. The PIXE spectroscopy system of claim 15, wherein the magnetic deflector comprises an isolating spacer adjacent to the outer surface of the rear cover, the isolating spacer configured to electrically isolate the magnetic deflector from the X-ray detector positioned adjacent to the rear cover.

19. The PIXE spectroscopy system of claim 15, wherein the magnetic deflector comprises a removable exit aperture detachably attached to the rear cover, the exit aperture comprising an opening aligned with the canal of the rear cover, the opening configured to limit ions exiting the magnetic deflector through the exit aperture.

20. The PIXE spectroscopy system of claim 19, wherein the opening of the exit aperture is substantially aligned with the opening of the entrance aperture.

* * * * *